Figure 1:
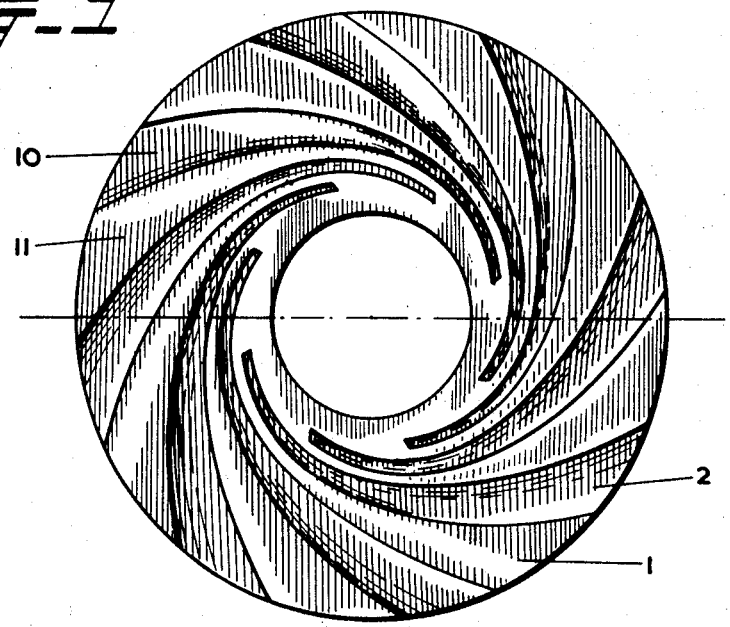

United States Patent
Murray

[15] 3,659,324
[45] May 2, 1972

[54] METHOD FOR MANUFACTURING AN AXIAL BEARING

[72] Inventor: Hans E. H. Murray, Lerum, Sweden

[73] Assignee: Aktiebolaget Svenska Kullagerfabriken, Goteborg, Sweden

[22] Filed: Feb. 20, 1970

[21] Appl. No.: 12,934

[30] Foreign Application Priority Data

Feb. 24, 1969 Netherlands..........................6902851

[52] U.S. Cl......................29/149.5 PM, 29/558, 29/DIG. 26
[51] Int. Cl. ....................................B21d 53/10, B23p 13/04
[58] Field of Search ...................29/149.5 R, 558, 149.5 PM, 29/149.5 DP, DIG. 26, 420.5; 308/237

[56] References Cited

UNITED STATES PATENTS

| | | | |
|---|---|---|---|
| 2,329,483 | 9/1943 | Queneau et al. | 308/237 R |
| 2,517,430 | 8/1950 | Hensel et al. | 29/149.5 PM X |
| 3,430,322 | 3/1969 | Henle et al. | 29/558 |
| 3,518,740 | 7/1970 | Caubet | 29/149.5 R |

Primary Examiner—Thomas H. Eager
Attorney—Howson & Howson

[57] ABSTRACT

A method of manufacturing an axial bearing part made of a sintered metal powder having a carbon content of less than 0.1 percent and having a plurality of spiral grooves in at least one face thereof consisting of the steps of forming in a pressing die a plurality of grooves corresponding to the ridges between the grooves in the bearing part, grinding the die face smoothly and thereafter pressing the die face in the bearing part to form the spiral grooves.

8 Claims, 7 Drawing Figures

INVENTOR:
HANS E. H. MURRAY

BY  Howson & Howson
ATTORNEYS

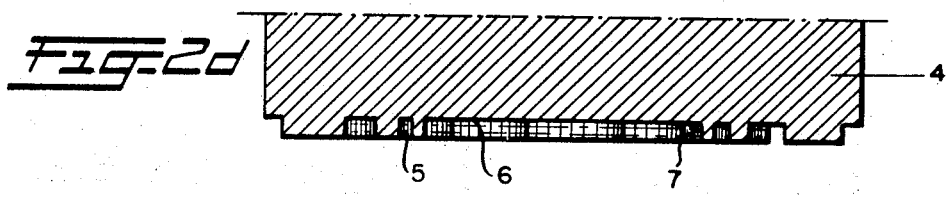
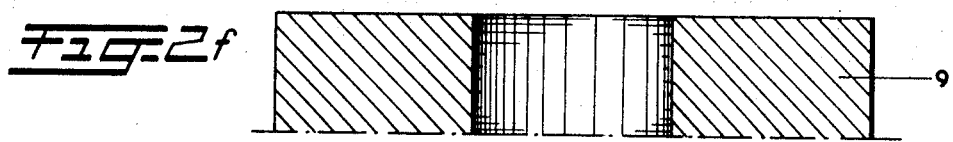

METHOD FOR MANUFACTURING AN AXIAL BEARING

The present invention relates to a method for the manufacturing of an axial bearing at least one of the cooperating bearing surfaces of which being provided with shallow spiral grooves extending in such a way that during operation a lubricant is driven up between the bearing surfaces, which grooves are obtained by making use of etching. A method of this kind is known from the published Dutch Patent application Nos. 298,535 and 65.09207. According to said method spiral grooves are formed a bottom and side walls of which due to the etching have a relatively rough surface, e.g. with a roughness of 20 micron. The operation of such bearings is the result of the pumping done by the spiral grooves and due to which the lubricant is driven up. This lubricant can be any suitable gaseous or liquid fluid. This rough surface is detrimental for a well pumping operation.

Grooves with a smooth surface can be obtained by a grinding operation. This, however, is a comparatively difficult and expensive operation especially if the grooves, as usual, diminish in width towards the center of the bearing.

Purpose of the invention is the provision of a method by means of which it is possible to manufacture such an axial bearing in a simple and cheap manner and by means of which side walls and bottom of the grooves will obtain considerably less roughness with other words will be practically smooth.

According to the invention this purpose has been achieved in that in a pressing die grooves are etched or machined corresponding to the bearing parts or ridges between the grooves, this die subsequently is ground flat with the maintenance of the etched grooves and thereafter the spiral grooves are pressed by means of this die into a bearing part made from sintered steel or iron or metal powder having a carbon content of less than 0.3 percent. The initial work piece of the die can have a comparatively rough surface. In this surface grooves are etched, the forms and dimensions of which correspond to the surface of the ridges which in the bearing part to be manufactured are located between the grooves. When this die is ground flat subsequently a die is obtained having grooves in it theside walls and bottom of which have a rough surface. The front surface of the die has been ground smooth.

Parts made from sintered steel or iron powder with a very low carbon content have a high cold deformability. If such a bearing part, e.g. a disk made from sintered steel or iron powder is treated with the etched and ground die the etched grooves of the die will form ridges in the sintered part with in-between grooves. It herewith appears that side walls of the grooves are formed which are smooth whereas the bottom is smooth due to the smooth front face of the die. The bearing part obtained has ridges which still have a rough surface. This is no objection since during the operation of the bearing the bearing parts are kept separated by the lubricant. This roughness, however, can be removed as well by a simple grinding operation.

With the method according to the invention groove walls are obtained having a roughness of less than 1 micron.

According to the invention it is further possible to coat the bearing surface with, e.g., nickel or chromium.

If after the coating annealing takes place at a temperature of, e.g., 1,000° C the nickel or chromium penetrates and forms a metallurgical bound with the sintered iron grains.

The invention now will be further elucidated with reference to the drawings.

FIG. 1 is an upper view of the bearing part of an axial bearing having spiral grooves. This bearing part comprises a disc 1 with a number of spiral grooves 2 of small depth, which grooves have a width diminishing in the direction towards the center of the bearing ring. If the disc like bearing part 1 forms the stationary part, the other part which has to be located on top of it has to rotate clockwise to generate the driving up of the lubricant in the grooves 2.

Figure 2A:
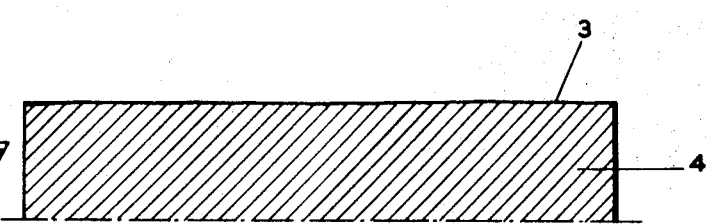

FIGS. 2a–2f indicate the different stages of the method diagrammatically. In FIG. 2a the somewhat rough surface 3 of the die 4 has been shown.

Figure 2B:
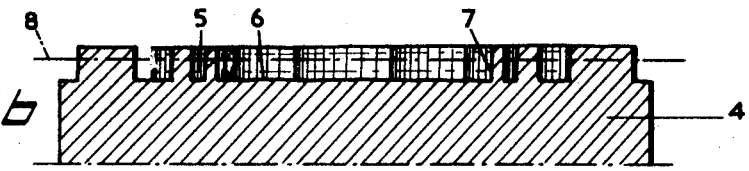
Figure 2C:

In FIG. 2b the same die has been shown but now after grooves 5 having been etched therein, each groove having a rough bottom 6 and rough side walls 7. This die now according to the line 8 is ground after which the situation of FIG. 2c has been obtained. According to FIG. 2d, this die 4 is used for treating a work piece 9 in FIGS. 2e and 2f having the form of a disk and being made from sintered metal, steel or iron powder having a very low carbon content, e.g. of 0.05 percent.

FIG. 2e shows what finally has been obtained. The bearing part 9 then has grooves 10 with a smooth bottom and smooth side walls. Only the top surface 11 is not smooth, but if necessary, this can be obtained by a simple grinding operation.

I claim:

1. A method of manufacturing an axial bearing part made of a sintered metal powder having a carbon content of less than 0.1 percent and having a plurality of spiral grooves in at least one face thereof consisting of the steps of forming in a pressing die a plurality of grooves corresponding to the ridges between the grooves in the bearing part, grinding the die face smoothly and thereafter pressing the die face in the bearing part to form the spiral grooves.

2. A method as claimed in claim 1 wherein the grooves are formed in the pressing die by etching.

3. A method as claimed in claim 1 wherein the grooves in the pressing die are formed by machining.

4. A method as claimed in claim 1 including the step of coating at least said one face of the bearing part with nickel.

5. A method as claimed in claim 1 including the step of coating at least said one face of the bearing part with chromium.

6. A method as claimed in claim 1 including the step of annealing said one face of the bearing part.

7. A method as claimed in claim 1 including the step of nitriding the bearing part.

8. A method as claimed in claim 1 including the step of heat treating the bearing part.

* * * * *